United States Patent
Hamburg et al.

(10) Patent No.: US 9,251,574 B2
(45) Date of Patent: Feb. 2, 2016

(54) IMAGE COMPENSATION VALUE COMPUTATION

(71) Applicant: Adobe Systems Incorporated, San Jose, CA (US)

(72) Inventors: Mark C. Hamburg, Woodinville, WA (US); Eric Chan, Belmont, MA (US)

(73) Assignee: Adobe Systems Incorporated, San Jose, CA (US)

( * ) Notice: Subject to any disclaimer, the term of this patent is extended or adjusted under 35 U.S.C. 154(b) by 84 days.

(21) Appl. No.: 14/108,793

(22) Filed: Dec. 17, 2013

(65) Prior Publication Data
US 2015/0170346 A1      Jun. 18, 2015

(51) Int. Cl.
| | | |
|---|---|---|
| *G06K 9/40* | (2006.01) | |
| *G06T 5/00* | (2006.01) | |
| *H04N 5/235* | (2006.01) | |
| *H04N 5/57* | (2006.01) | |
| *H04N 9/64* | (2006.01) | |
| *H04N 5/262* | (2006.01) | |
| *G01J 3/46* | (2006.01) | |

(52) U.S. Cl.
CPC ............. *G06T 5/009* (2013.01); *H04N 5/2355* (2013.01); *H04N 5/57* (2013.01); *H04N 9/646* (2013.01); *G01J 3/46* (2013.01); *G06K 9/40* (2013.01); *G06T 2207/10024* (2013.01); *G06T 2207/20076* (2013.01); *G06T 2207/20208* (2013.01); *H04N 5/2628* (2013.01)

(58) Field of Classification Search
CPC ..................... G06T 5/009; G06T 2207/20208; G06T 2207/20076; G06T 2207/10024; H04N 5/2355; H04N 5/57; H04N 9/646; G01J 3/46; G06K 9/40
USPC .......................................... 382/255, 274–275
See application file for complete search history.

(56) References Cited

U.S. PATENT DOCUMENTS

| | | | |
|---|---|---|---|
| 7,551,797 B2* | 6/2009 | Dorrell ................ | H04N 1/6086 348/224.1 |
| 7,609,908 B2* | 10/2009 | Luo et al. ....................... | 382/274 |
| 8,355,595 B2* | 1/2013 | Bressan .................. | G06T 5/009 382/266 |
| 2002/0135743 A1* | 9/2002 | Gindele ........................... | 355/18 |
| 2009/0040364 A1* | 2/2009 | Rubner .......................... | 348/362 |
| 2010/0118204 A1* | 5/2010 | Proca et al. ................... | 348/671 |

* cited by examiner

*Primary Examiner* — Kanjibhai Patel
(74) *Attorney, Agent, or Firm* — Wolfe-SBMC

(57) ABSTRACT

Image compensation value computation techniques are described. In one or more implementations, an image key value is calculated, by a computing device, for image data based on values of pixels of the image data. A tuning value is computed by the computing device using the image key value. The tuning value is configured to adjust how the image data is to be measured to compute an image compensation value. The image compensation value is then computed by the computing device such that a statistic computed in accordance with the tuning value approaches a target value. The image compensation value is applied by the computing device to adjust the image data.

13 Claims, 5 Drawing Sheets

400 —

402
Compute a tuning value, by a computing device, that is configured to adjust how image data is to be measured to compute an image compensation value

404
Compute the image compensation value by the computing device using a power mean statistic and the tuning value

406
Apply the image compensation value by the computing device to adjust exposure of the image data

*Fig. 4*

IMAGE COMPENSATION VALUE COMPUTATION

BACKGROUND

Users may capture images in a variety of different locations using a variety of different devices. This may include use of dedicated image capture devices (e.g., traditional cameras), mobile communication devices having image capture features (e.g., mobile phones and tablets), and so on. As such, the image may be corrupted to a greater or lesser degree due to limitations of the image capture device and/or the location at which the image was captured, e.g., low light, overly bright surroundings, and so on.

Accordingly, techniques have been developed to adjust the image to correct such corruption. For example, conventional techniques may be employed to correct exposure, contrast, and so on. However, in some instances, these conventional techniques may fail for their intended purpose. This may be due to a variety of factors, such as when confronted with images having large dark or light areas which may act to skew an adjustment that is calculated for the image.

SUMMARY

Image compensation value computation techniques are described. In one or more implementations, an image key value is calculated, by a computing device, for image data based on values of pixels of the image data. A tuning value is computed by the computing device using the image key value. The tuning value is configured to adjust how the image data is to be measured to compute an image compensation value. The image compensation value is then computed by the computing device such that a statistic computed in accordance with the tuning value approaches a target value. The image compensation value is applied by the computing device to adjust the image data.

In one or more implementations, a tuning value is computed by a computing device that is configured to adjust how image data is to be measured. An image compensation value is then computed by a computing device using a power mean statistic and the tuning value. The image compensation value is then applied by the computing device to adjust exposure of the image data.

In one or more implementations, a system includes one or more modules implemented at least partially in hardware. The one or more modules are configured to perform operations that include computing a tuning value that is configured to adjust how image data is to be measured to compute an image compensation value, computing the image compensation value such that a statistic computed in accordance with the tuning value approaches a target value, and applying the image compensation value to adjust the image data This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 4 is a flow diagram depicting a procedure in an example implementation in which an image compensation value is computed using a power mean statistic.

DETAILED DESCRIPTION

Overview

Image data of images that are captured by image capture devices (e.g., a smartphone, tablet, dedicated device, and so on) often include abnormalities that may be a result of the image capture device itself, an environment in which the image capture device was used, and so on. For example, exposure of the image may not be "pleasing" to the human eye by being too light or too dark. Techniques have been developed to adjust the images, such as the exposure of the image as described above. However, these conventional techniques often fail as these techniques often rely on a fixed value to perform the adjustment, rather than determining an amount of adjustment to be made to correct the image.

Accordingly, image compensation value computation techniques are described. In one or more implementations, an image statistic is constructed that is adapted to a general nature of an image. This statistic is then utilized as a basis to compute an image compensation value that is to be used to optimize an adjustment that is to be made to the image. One example of such as statistic is computed as a power mean of pixel values of the image, e.g., to correct exposure, tone, and so forth. The choice of power in this example supports the ability to adapt the statistic to bias toward higher values or lower values. In this way, the choice of power and hence the adaptation to the image may be based on an estimate of an image key value for the image. For example, images having low image key values are generally dark and therefore a higher power value is used to give greater emphasis to brighter portions of the image to avoid excessive brightening. Conversely, images having relatively high image key values (i.e., are relatively light) use a lower power value to give greater emphasis to darker portions of the image to avoid excessive darkening. Further discussion and other examples of adjustments that may be made to pixels of image data may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
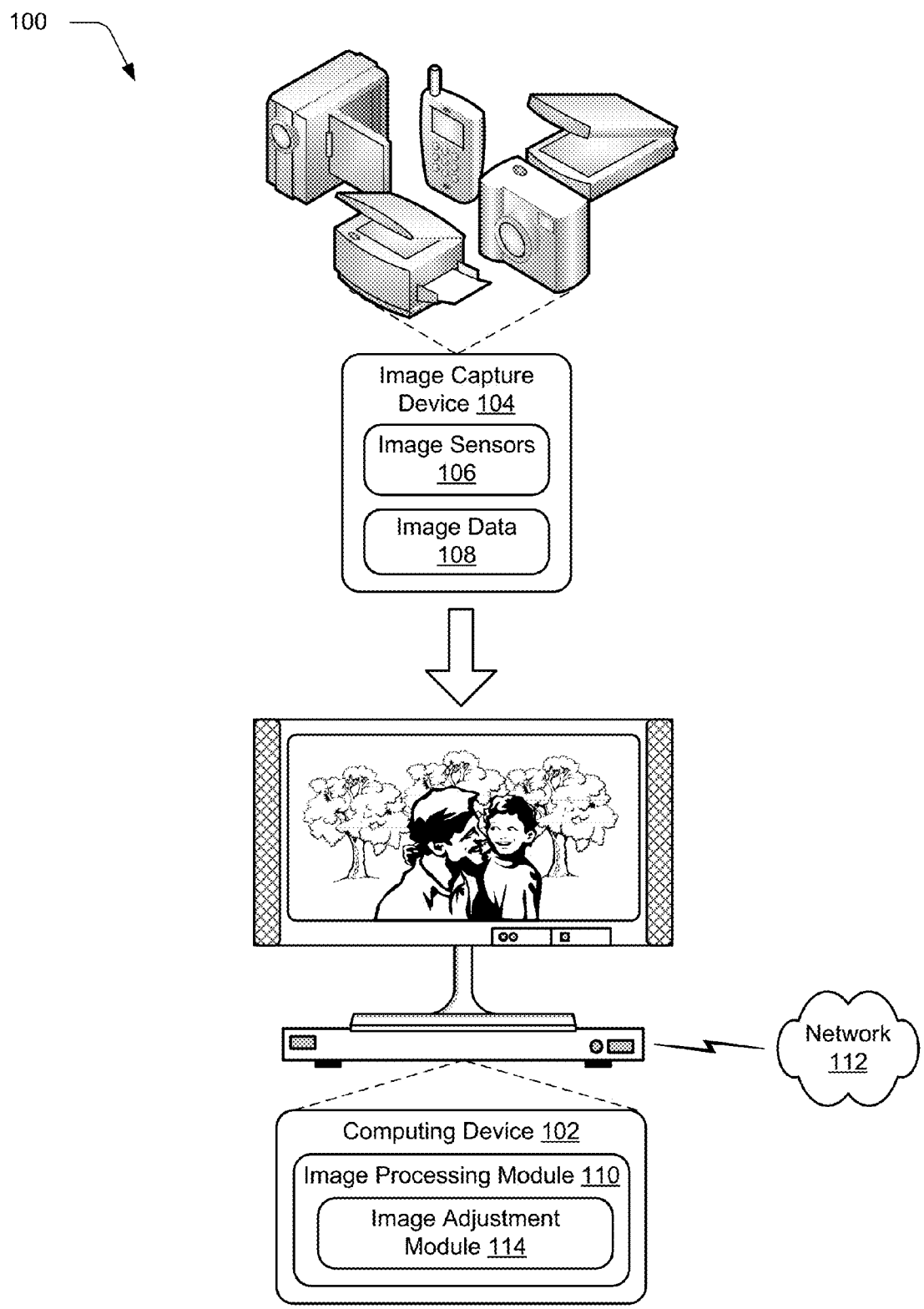
FIG. 1 is an illustration of an environment in an example implementation that is operable to employ techniques described herein relating to image compensation value computation.

FIG. 1 is an illustration of an environment 100 in an example implementation that is operable to employ techniques described herein. The illustrated environment 100 includes a computing device 102 and an image capture device 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 5.

The image capture device 104 may also be configured in a variety of ways. Illustrated examples of such configurations include a video camera, scanner, copier, camera, mobile device (e.g., smart phone), and so forth. Although the image capture device 104 is illustrated separately from the computing device 102, the image capture device 104 may be configured as part of the computing device, e.g., for a tablet configuration, smart phone as illustrated, and so forth.

The image capture device 104 is illustrated as including image sensors 106 that are configured to capture and generate image data 108. For example, the image sensors 106 may be configured to capture images using a Bayer pattern, in a raw format, and so on. The image data 108 may also be partially processed, e.g., by an image data pipeline using a variety of different operations as part of default processing. Examples of these operations include interpolation of the image data in the raw format (e.g., a Bayer pattern) into a red, green, and blue image format, de-mosaicking, gamma correction, sharpening, de-noising, and so on. Thus, the image data 108 may take a variety of different forms.

The computing device 102 is illustrated as including an image processing module 110. The image processing module 110 is representative of functionality of the computing device 102 to process an image. Although illustrated as implemented locally at the computing device 102, this functionality may be implemented in a variety of ways, such as remotely over a network 112 as part of a web service, distributed between the computing device 102 and a web service (e.g., by obtaining a locally executable runtime module for execution in a browser or web application process), and so on.

An example of image processing that may be performed by the image processing module 110 is represented as an image adjustment module 114. The image adjustment module 114 is representative of functionality to adjust image data 108 automatically and without user intervention, such as to adjust tone, exposure, contrast, and so on of the image data 108. An example of operation of the image adjustment module 114 is described as follows and shown in a corresponding figure.

Figure 2:
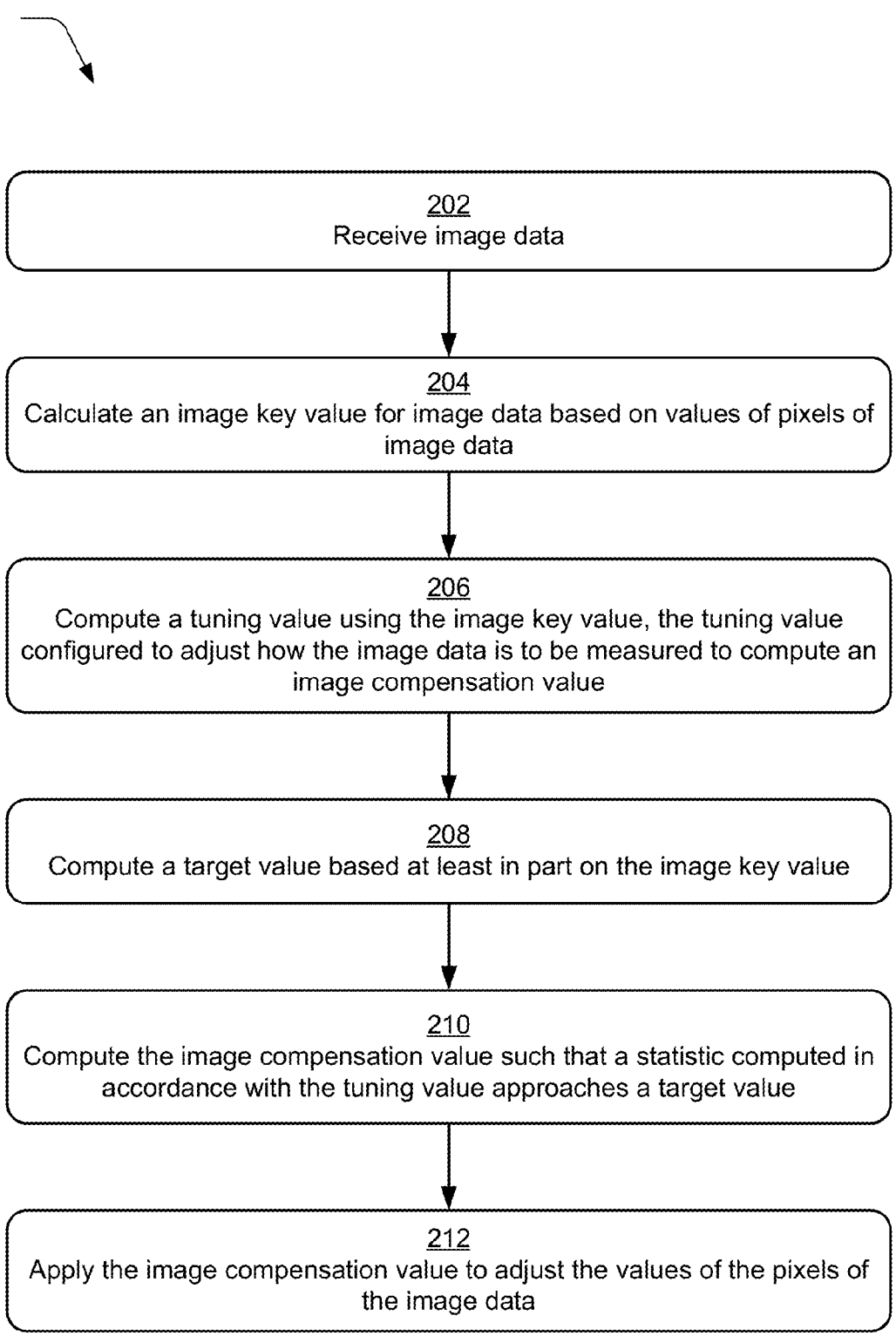
FIG. 2 is a flow diagram depicting a procedure in an example implementation in which an image key value and a tuning value are computed and used to compute an image compensation value.
Figure 3:
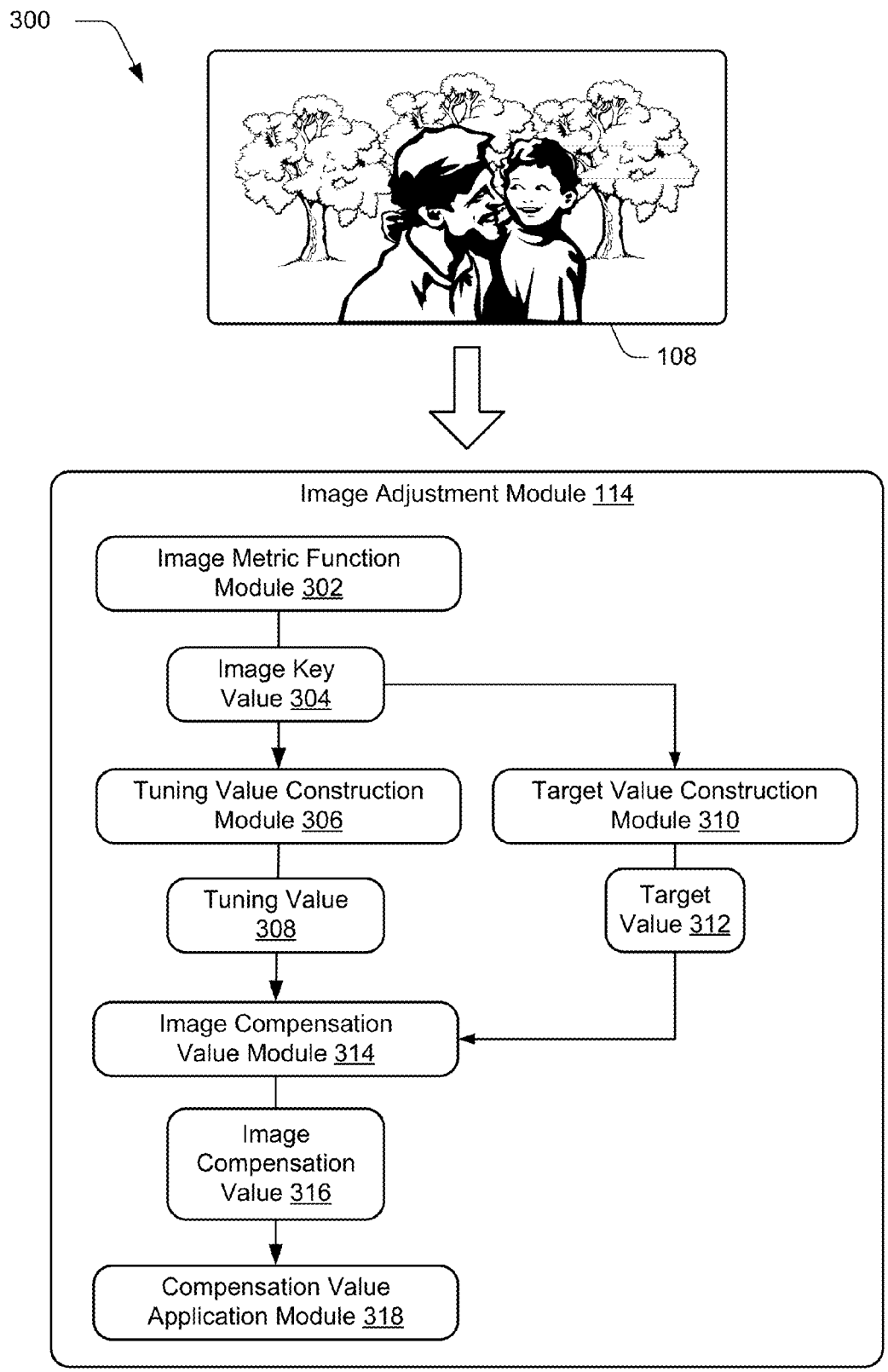
FIG. 3 is an illustration of a system showing an image adjustment module of FIG. 1 in greater detail.

The following discussion describes example image compensation value adjustment techniques that may be implemented utilizing corresponding systems and devices, as well as other systems and devices. Further, the systems and devices may also be utilized to perform other procedures and arrangements thereof. Aspects of the procedure 200 of FIG. 2 may be implemented in hardware, firmware, or software, or a combination thereof. The procedure 200 is shown as a set of blocks that specify operations performed by one or more devices, an example of which is illustrated by the corresponding system 300 of FIG. 3. The operations are not necessarily limited to the orders shown for performing the operations by the respective blocks. Further, performance of these operations is not limited to the example system. Accordingly, the following discussion is arranged as including a description of the system and procedures in parallel.

Image data is received (block 202), such as image data 108 by the image adjustment module 114. The image data 108 may take a variety of different forms, such as in a form captured by the image sensors 106 of the image capture device 104, image data 108 that has been processed (e.g., by one or more default image correction techniques), and so on.

An image key value is calculated for the image data based on values of pixels of the image data (block 204). The image adjustment module 114 of FIG. 3, for instance, may include an image metric function module 302 that is representative of functionality to construct an image key value 304. For example, the image metric construction module 302 may employ an image metric that is adapted to described values of individual pixels of the image for an image metric, such as exposure, contrast, tone, and so on as further described below. An image key value 304 may then be used to describe a value of these individual values as a whole, for different portions of the image, and so on.

A tuning value is then computed using the image key value. The tuning value is configured to adjust how the image data is to be measured to compute an image compensation value (block 206). The image adjustment module 114, for instance, is also illustrated as including a tuning value construction module 306 that is representative of functionality to compute a tuning value 308 from the image key value 304. For example, the tuning value construction module 306 may be used to calculate a metric parameter "p" using the image key value 304 which may be used to guide calculations of the image compensation value as further described below in relation to the description of an example of computation of the image compensation value.

A target value may also be computed based at least in part on the image key value (block 208). The image adjustment module 114, for instance, may optionally include a target value construction module 310 that is representative of functionality to compute a target value "t" 312 from the image key value 304 for use in calculation of the image compensation value as further described below. The target value may also be predefined (e.g., set to a predefined value) and thus not leverage the image key value 304 in such a situation.

An image compensation value is then computed such that a statistic computed in accordance with the tuning value approaches a target value (block 210). For example, an image compensation value module 314 may be utilized to generate the image compensation value 316 using the tuning value 308 and a target value 312, which may be obtained from the target value construction module 310 or predefined as described above. The image compensation value 316 may describe an amount of compensation that is to be applied for the metric measured by the image metric function module 302, e.g., exposure, tone, contrast, and so on. Thus, this value may describe an amount of correction to be applied to the image data 108, which may be performed automatically and without user intervention.

The image compensation value is then applied to adjust the values of the pixels of the image data (block 212). For example, the image compensation value 316 may be obtained by a compensation value application module 318 that is representative of functionality of the image adjustment module 114 to adjust the image data 108. Thus, the amount of adjustment described by the image compensation value 316 may be used by this module to compensate the image data 108 based on the metric being measured. An example of one such metric, exposure, is described as follows and shown in corresponding figure.

FIG. 4 depicts a procedure 400 in an example implementation in which a power mean technique is utilized to compute an image compensation value to adjust exposure of image data. Operations described in the following discussion may be implemented utilizing the previously described systems and devices. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In portions of the following discussion, reference will be made to the environment 100 of FIG. 1 and the system 300 of FIG. 3.

As described above, an initial image and a compensation function may be used to process an image using a compensation value to produce a compensated image. An example of this is described as follows which involves exposure compensation using a scalar exposure compensation value to produce a compensated image:

$E(\text{initial\_image}, \text{exposure\_compensation}) \rightarrow \text{compensated\_image}$ This may be subject to the condition that if:

exposure_compensation_1 < exposure_compensation_2; and compensated_image_1 = E(initial_image, exposure_compensation_1); and compensated_image_2 = E(initial_image, exposure_compensation_2)

then at all locations x, y in the compensated images:

compensated_image_1[x, y] <= compensated_image_2 [x, y]

In other words, raising the exposure compensation does not darken the image.

To note, the calculation may be performed without the initial image in some instances because just the results of the exposure compensation function are shown. Accordingly, the above scheme may also function by treating the exposure compensation function as a function for producing images, e.g., via a rendering process, based on an exposure compensation value. As an additional note, the exposure compensation function may be included as part of a processing function having increased complexity, e.g., the exposure compensation function may include contrast compensation as well.

In the following discussion, the following expression is used:

$E'(\text{exposure\_compensation}) \rightarrow \text{image}$ which binds the initial image and any other parameters as a notational convenience.

The exposure compensation value may be calculated automatically and without user intervention by one or more computing devices to produce an image, and more particularly pixels of image data of the image, that are pleasing to the human eye. However, pleasing is a subjective term and therefore is approximated by computing an image statistic and seeking a value that approximates and may even match that statistic.

For instance, assume an image statistic "M" such that for two images (e.g., image_1 and image_2) if at all locations "x," "y:"

image_1[x, y] ≤ image_2[x, y]

then:

M(image_1) ≤ M(image_2)

In other words, "M" is a non-decreasing function varying with image brightness.

Combining this with properties asserted for the exposure compensation function, a non-decreasing function may be constructed from exposure compensation value to image metric value by concatenating "E" and "M," which may be referred to as function "E_M."

Since "E_M" is non-decreasing over the domain of exposure compensation values, a binary search may be performed to find an exposure compensation value that matches a particular target metric value. Examples of metrics include the average of the darkest and brightest pixel values, the mean of the pixel values throughout the image, or the median of the pixel values throughout the image. For each of these cases (provided color spaces are appropriately chosen) it is reasonable to target a value of "0.5." The case of the mean in a gamma compensated space approximating human visual response and a target value of "0.5" (assuming a normalized image range of 0 to 1) may work well for many images.

These metrics, however, may be challenged in certain situations as previously described. For example, these metrics may fail if an image has large dark areas, e.g., black curtains on a stage, which pulls a value of the mean and the median down which results in setting the exposure compensation value too high to try to compensate for this. Similarly, if an image has large very light regions such as a white backdrop or windows filled with bright sunlight, values of the mean and median are "pulled up" by these regions and hence the exposure compensation value may be set excessively low to try to compensate for this.

Accordingly, the techniques described herein may address these challenges in a variety of ways, an example of which is as follows. First, image data 108 may be received as before, which may be configured as an "initial" image as received from the image capture device 104, or an image to which default compensation has been applied, i.e., "E'(default_compensation)."

An image metric function "K" is then applied that examines the distribution of image values in the image data 108 to produce an image key value for exposure in this example. For instance, a high image key value in this example (e.g., near 1.0) may reflect images that are dominated by light colors, a low image key value (e.g., near 0.0) may describe images that are dominated by dark colors, images having mid image key values (e.g., at approximately 0.5) may have more even distributions than the other two examples, and so on. Thus, the image key value may be used to describe characteristics of the image data 108 such as exposure in this example. Other examples of characteristics are also contemplated, such as tone, contrast, and so on.

Using the image key value "k," a metric parameter "p" is computed that is to be used in conjunction with a parameterized metric function "M{p}" such that for a given image "I" and parameter values "p_1" and "p_2," if "p1<p2" then "M{p1}(I)≤M{p2}(I)." Thus, the image key value may be used to generate the tuning value as a metric parameter "p" that is to be used with the parameterized metric function "M{p}." As also described above, the image key value "k" may also be used to compute the target value "t." The target value may also be predefined as previously described.

A binary search may then be performed to find an exposure compensation value as follows:

$M\{p\}(E'(\text{exposure\_compensation})) = t$

To perform this, a power mean technique may be used. For example, an ordinary mean on a set of "N" samples "x[i]" may be computed as:

$$\text{sum}(x[i])/N$$

However, the power mean for a given power "p" may be computed as:

$$\text{pow}(\text{sum}(\text{pow}(x[i],p))/N, 1/p)$$

In other words, each of the samples is raised to the power "p," the mean of those altered samples is then computed, and then that mean is raised to the power of "1/p." A root-mean-square technique is a specific case where "p=2."

In one or more implementations, this technique may result in a complication in the vicinity of "p=0" because this tends to result in computing "pow(1, infinity), which is indeterminate. As it turns out, this case corresponds to the geometric mean which can be computed as:

$$\exp(\text{sum}(\ln(x[i])))/N$$

So, in the vicinity of "p=0," this value may instead be computed and then linear interpolation used as a bridge in relation to true power mean computations.

Power means have the property cited above for image metrics in that higher powers result in the mean biasing higher. The power mean technique is utilized to compute values within the range from the image, but bias toward the darker values or the lighter values as "p" moves down or up in this instance that involves exposure.

Accordingly, the tuning value is computed that is configured to adjust how image data is to be measure to computing an image compensation value (block 402). For example, an image key value "k" is computed and used to compute a power "p" (and optionally a target "t" if not predefined).

The image compensation value is then computed by the computing device using a power mean statistic and the tuning value (block 404). This image compensation value may then be applied by the computing device to adjust exposure of the image data (block 406). Continuing with the previous example, these values are then used to find a compensation value such that the compensated image has power mean "t" for power "p." For high values of the image key value for exposure (e.g., toward 1), a lower power "p" is computed that will bias toward the darker portions of the image and thereby brings the darker portions toward the middle of the range. For low values of the image key value for exposure (e.g., toward 0), a higher power "p" is computed that causes a bias toward optimizing the brighter portions of the image and gives less attention to the darker portions.

In computing a target value, the image key value or other statistics may be used to raise the target for high image key value images or for images with low contrast ratios which often benefit from being brighter. Thus, techniques are described in which a parameterized metric is used, describe use of a power mean technique as a metric, and describe computation of a parameter for the metric based on a characterization of the key of the initial image. An implementation example is described as follows.

In this example, an image key value is computed based on a default processing of the image data 108. This statistic estimates exposure of the image data 108. This value may be computed based on computing:

Black and white points trimmed of a small fraction of extreme values on either end; and A mean in log space of the pixels again ignoring a small fraction of values at either end.

These three values are converted to linear space and the relative position of the mean value between the black value and the white value is computed.

This relative position is then raised to the 0.404 power in this example, which has the effect of mapping 0.18 to 0.5. This accounts for the fact that in linear space, the perceptual midpoint actually lies closer to black (0.0) than to white (1.0). The resulting value is the image key value key estimate, which may range from 0.0 indicating an image composed largely of dark pixels, 0.5 indicating a reasonably balanced image, and 1.0 indicating an image composed largely of light pixels. Other statistics such as the median may be used in place of the mean.

A power value is computed to use in the power mean statistic by computing "pow(4.0, 1.0−2.0*key)." The choice of 4.0 is arbitrary in this example, but gives a reasonable range. The choice of using the "pow" function is also arbitrary but it delivers a nice response allowing a transition from large values when key is small to small values when key is large. The "1.0−2.0*" key is driven by the range for the image key value as computed above.

An optimization phase then takes a candidate parameter value, processes a low-resolution version of the image using this value, and computes a statistic to be optimized. The value of this statistic as it compares to a target value is used to drive a binary search process for an optimal parameter value. In the case of an image data in a raw image format, the parameter in question is the exposure compensation but it may also be any other image brightness adjustment such as a gamma control. In one or more implementations, these techniques may be applied to a downsized version of a full image since repeated processing may be involved. After the compensation value is computed, for instance, the value may be used to adjust the "full" image.

The statistic that is optimized in this example is a power mean of the image values in linear space in accordance with the power value computed above. The choice of linear space is arbitrary but it seems to give a reasonable bias toward how much light associated with an image is perceived by a person.

Thus, as above image data 108 is received for which an "optimal" value for exposure (i.e., brightness) is to be computed. An image key value is computed that is indicative of whether the image is biased toward dark or light pixels or is relatively balanced between dark and light pixels. The image key value is used to compute a tuning value that is usable to adjust how the image is measured during the optimization phase. An optimal parameter value is then computed such that a statistic computed in accordance with the tuning value comes as close as possible to a target value. This may be performed in a way such that the tuning value is a power value and the tuned image statistic is a power mean.

A power mean may be expressed as "pow(sum(pow(x, k))/N, 1/k)" where "k" is the power and "N" is the number of samples and "x" represents the individual samples. Root-mean-square is a specific case where "k=2." A log mean may be expressed as mean of the log values, e.g., "sum(ln x)/N" where "x" is expressed in linear space. In another example, if the value is be converted back to linear space, the following expression may be used:

$$\text{compute } \exp(\text{sum}(\ln x)/N).$$

Actual conversions between linear and log space may be configured to account for flare values, since using zero for the darkest linear value may be desired. A variety of other examples are also contemplated.

In another implementation example, the following may be expressed:

log Min=trimmed black value in log space;
log Mid=log of power mean of linear values using a power of 1/2.2—i.e., biased toward dark but not as dark as the log mean at power 0; and
log Max=trimmed white value in log space.
Also, the following expression holds:

rawKey=(log Mid−log Min)/(log Max−log Min)

The key is then scaled around the value 0.25 based on the dynamic range (measured as log Max−log Min). For images with a small dynamic range, this pushes the key estimates away from 0.25. For images with a large dynamic range, this compresses the estimates towards 0.25. Thus, this example has increased sophistication over the previous technique in that for low dynamic range images, images are rendered lighter unless the images are already quite dark. This can also be seen as saying low dynamic range images are regarded as having a higher key value unless the images are distinctly dark. The key is then run through a curve that maps "0" to "6.0", "0.5" to "1.8," and "1.0" to "−1.0" to obtain the power value. The key computation will be slightly lighter in this example because of the change in the computation of the mid value. But then unlike the previous example, it is not lightened by raising it to the 0.404 power. Additionally, the range of powers in the previous example is "4.0 to 0.25" whereas the current example uses a range from "6.0 to −1.0."

Example System and Device

Figure 5:
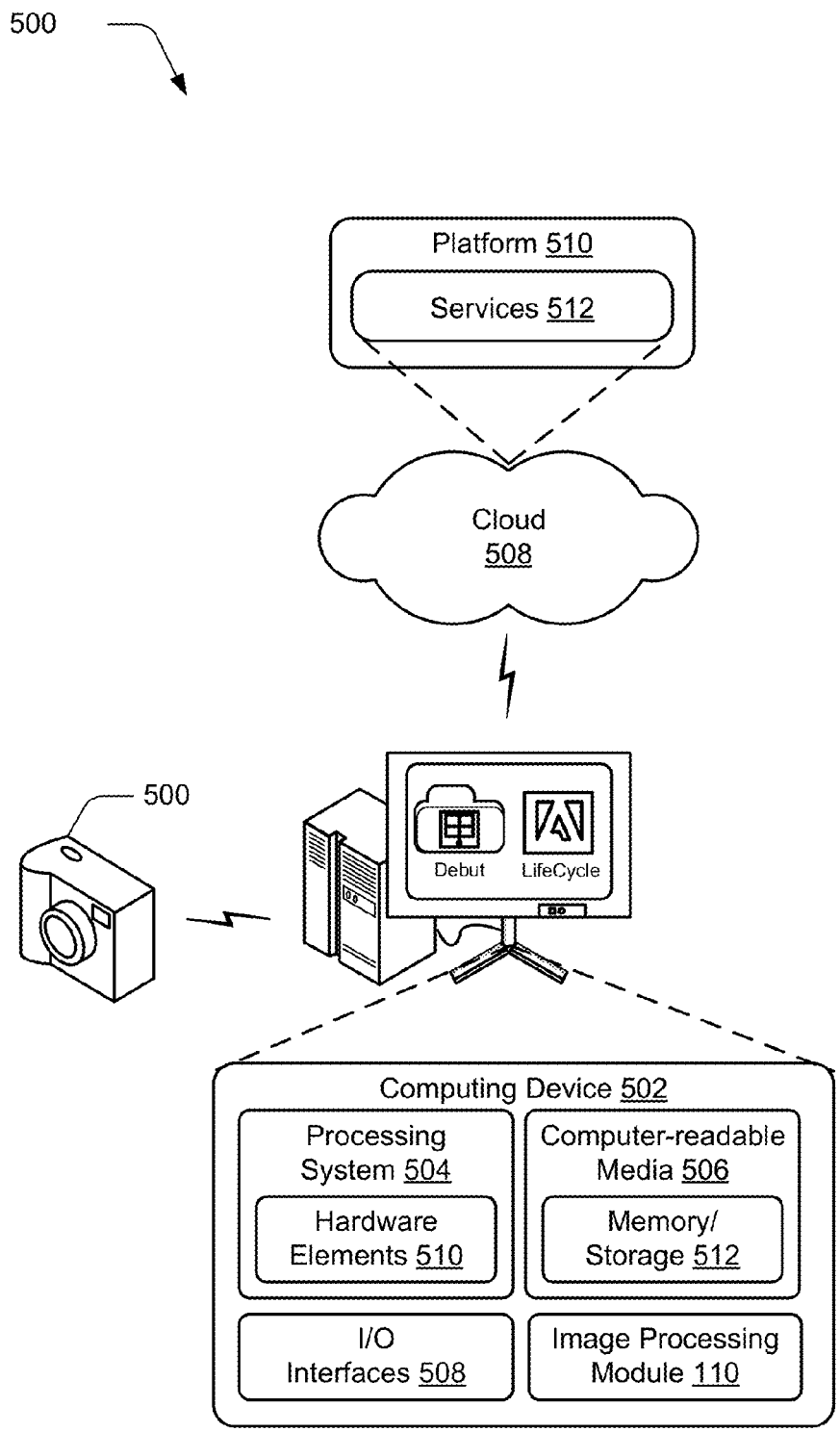
FIG. 5 illustrates an example system including various components of an example device that can be implemented as any type of computing device as described and/or utilize with reference to FIGS. 1-4 to implement embodiments of the techniques described herein.

FIG. 5 illustrates an example system generally at 500 that includes an example computing device 502 that is representative of one or more computing systems and/or devices that may implement the various techniques described herein. The computing device 502 may be, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interface 508 that are communicatively coupled, one to another. Although not shown, the computing device 502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware element 510 that may be configured as processors, functional blocks, and so forth. This may include implementation in hardware as an application specific integrated circuit or other logic device formed using one or more semiconductors. The hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 506 is illustrated as including memory/storage 512. The memory/storage 512 represents memory/storage capacity associated with one or more computer-readable media. The memory/storage component 512 may include volatile media (such as random access memory (RAM)) and/or nonvolatile media (such as read only memory (ROM), Flash memory, optical disks, magnetic disks, and so forth). The memory/storage component 512 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 510 of the processing system 504. The instructions and/or functions may be executable/operable by one or more articles of manufacture (for example, one or more computing devices 502 and/or processing systems 504) to implement techniques, modules, and examples described herein.

The techniques described herein may be supported by various configurations of the computing device 502 and are not limited to the specific examples of the techniques described herein. This functionality may also be implemented all or in part through use of a distributed system, such as over a "cloud" 520 via a platform 522 as described below.

The cloud 520 includes and/or is representative of a platform 522 for resources 524. The platform 522 abstracts underlying functionality of hardware (e.g., servers) and software resources of the cloud 520. The resources 524 may include applications and/or data that can be utilized while computer processing is executed on servers that are remote from the computing device 502. Resources 524 can also include services provided over the Internet and/or through a subscriber network, such as a cellular or Wi-Fi network.

The platform 522 may abstract resources and functions to connect the computing device 502 with other computing devices. The platform 522 may also serve to abstract scaling of resources to provide a corresponding level of scale to encountered demand for the resources 524 that are implemented via the platform 522. Accordingly, in an interconnected device embodiment, implementation of functionality described herein may be distributed throughout the system 500. For example, the functionality may be implemented in part on the computing device 502 as well as via the platform 522 that abstracts the functionality of the cloud 520.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
    calculating an image key value, by a computing device, for image data that describes a distribution of image values of characteristics of pixels of image data;
    computing a tuning value as a power value by the computing device using the image key value, the tuning value configured to adjust how the image data is to be measured to compute an image compensation value;
    computing the image compensation value by the computing device such that a power mean statistic computed in accordance with the tuning value approaches a target value; and
    applying the image compensation value by the computing device to adjust the values of the pixels of the image data.

2. A method as described in claim 1, wherein the image key value is an image key statistic based on a default processing of the image data.

3. A method as described in claim 1, wherein the image key value estimates relative preponderance of dark or light pixels in the image data.

4. A method as described in claim 1, wherein the target value is predefined.

5. A method as described in claim 1, further comprising computing the target value based at least in part on the image key value.

6. A method as described in claim 1, where the image data is a result of evaluation of an application of a compensation function with a default value.

7. A method as described in claim 1, wherein the calculating, the computing of the tuning value, the computing of the image compensation value, and the applying of the image compensation value are performed automatically and without user intervention by the computing device.

8. One or more non-transitory computer readable storage media comprising instructions stored thereon that, responsive to execution by one or more computing devices, causes the one or more computing devices to perform operations comprising:
    calculating an image key value, by the computing device, for image data based on values of pixels of the image data;
    computing a tuning value as a power value using the image key value, by the computing device, the tuning value configured to adjust how image data is to be measured to compute an image compensation value;
    computing the image compensation value by the computing device using a power mean statistic and the tuning value; and
    applying the image compensation value by the computing device to adjust exposure of the image data.

9. One or more non-transitory computer readable storage media as described in claim 8, wherein the image key value estimates relative preponderance of dark or light pixels in the image data.

10. One or more non-transitory computer readable storage media as described in claim 8, wherein the image key value is computed for an image metric function that is applied to a distribution of image values for the pixels in the image data.

11. A system comprising one or more modules implemented at least partially in hardware, the one or more modules configured to perform operations comprising:
- computing a tuning value that is configured to adjust how image data is to be measured to compute an image compensation value, the tuning value calculated from an image key value from the image data that describes a distribution of image values of characteristics of pixels of the image data;
- computing the image compensation value such that a power mean statistic computed in accordance with the tuning value approaches a target value; and
- applying the image compensation value to adjust the image data.

12. A system as described in claim 11, wherein the image key value estimates relative preponderance of dark or light pixels in the image data.

13. A system as described in claim 11, wherein the image key value is computed for an image metric function that is applied to the distribution of the image values for the pixels in the image data.

* * * * *